United States Patent [19]

Parker et al.

[11] Patent Number: 4,583,027
[45] Date of Patent: Apr. 15, 1986

[54] MOVING MAGNET LINEAR MOTOR

[75] Inventors: Rollin J. Parker, Greenville, Mich.; Allan W. Cornell, St. Louis, Mo.

[73] Assignee: Hitachi Metals International, Ltd., Edmore, Mich.

[21] Appl. No.: 684,125

[22] Filed: Dec. 20, 1984

Related U.S. Application Data

[63] Continuation of Ser. No. 453,609, Dec. 27, 1982, abandoned.

[51] Int. Cl.⁴ ............................................. H02K 33/00
[52] U.S. Cl. .................................... 318/128; 318/132; 310/15; 310/29
[58] Field of Search ............................... 318/118–132; 310/29, 28, 15, 12

[56] References Cited

U.S. PATENT DOCUMENTS

| | | | |
|---|---|---|---|
| 3,268,786 | 8/1966 | Reich | 318/128 |
| 3,331,239 | 7/1967 | Larsen et al. | 318/128 X |
| 3,480,848 | 11/1969 | Church | 318/128 |
| 3,798,521 | 3/1974 | Berney | 318/132 X |
| 4,346,318 | 8/1982 | Shtrikman | 310/12 |

Primary Examiner—Donovan F. Duggan
Attorney, Agent, or Firm—Hauke and Patalidis

[57] ABSTRACT

A linear electric motor having an oscillating linear armature disposed in proximity to a stationary stator and provided with an output member which can be directly coupled to a load. A power supply and control circuit is provided for matching the power input to the linear motor according to changing load conditions at the output.

9 Claims, 2 Drawing Figures

MOVING MAGNET LINEAR MOTOR

CROSS REFERENCE TO RELATED APPLICATION

The present application is a continuation of application Ser. No. 453,609, filed Dec. 27, 1982, now abandoned, and assigned to the same assignee as the present application.

BACKGROUND OF THE INVENTION

The present invention relates to a moving magnet oscillating linear electric motor for operating, for example, electric shavers and other devices to which a linear oscillating drive system is applicable such as compressors, pumps, saws, and the like.

There are many apparatus provided with a reciprocable input member that can be driven directly by a linearly reciprocating mechanical power output, rather than being driven by a rotating mechanical power output, such as a rotating shaft, with a motion converter means coupled between the rotating power output and the reciprocable member. Such rotary to linear converters may take the form, for example, of a crank and connecting rod, or of an eccentric mechanism, often including some gearing. They are of limited efficiency and are generally affected with considerable power losses and backlash between the rotary output and the driven linearly reciprocating input member.

The present invention provides a linear electric motor having a reciprocating output member which can be directly coupled to the linearly reciprocating input member of, for example, an electric shaver, a jig saw, a pump or compressor and the like.

SUMMARY OF THE INVENTION

The principal object of the present invention is to provide a linear electric motor having a reciprocable output member, which is of simple structure, highly efficient, and comprises a minimum of parts.

A further object of the present invention is to provide a control circuit for an oscillating linear electric motor having appropriate feed-back automatically setting the conditions of operation of the motor such as to match the power input to the motor according to changing load conditions at the output.

Those and other objects of the present invention will become apparent to those skilled in the art when the following description of the best mode presently contemplated for practicing the invention is read in conjunction with the accompanying drawing wherein:

DETAILED DESCRIPTION OF THE PREFERRED EMBODIMENT

Figure 1:
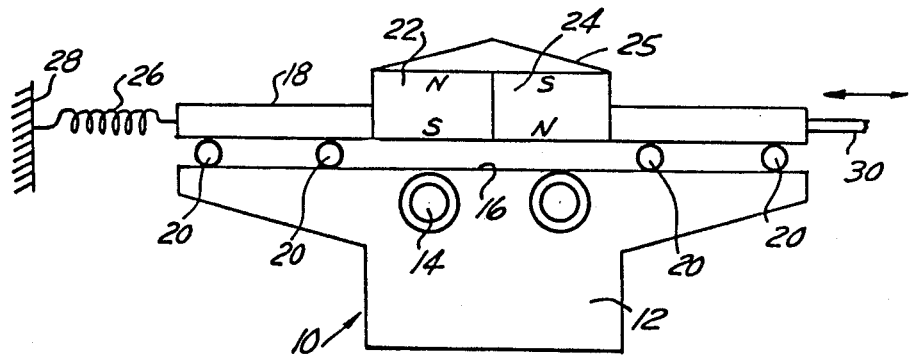
FIG. 1 is a schematic representation of a moving magnet oscillating linear motor according to the present invention.

Referring to FIG. 1, a moving magnet oscillating linear motor 10 according to the present invention comprises a stator 12 made of an appropriate material such as a plurality of laminated soft iron plates, or made of a block of plastic impregnated magnetic material. An appropriate electrical current induction coil or winding 14 is embedded in the stator 12 proximate a face 16 thereof. A linear armature 18 is mounted in close proximity to the stator face 16 by means such as linear bearings 20, such as to be freely linearly movable relative to the stator 12, substantially parallel to the stator face 16. The linear armature 18 carries a pair of high strength permanent magnets 22 and 24, having their pole polarity disposed in opposite directions as shown in the drawing, and provided with a flux return path member 25. A resilient restraining member in the form of, for example, a coil spring 26 elastically connects one end of the linear armature 18 to a stationary member 28 which, for example, may be a bracket attached to the stator or the wall of a housing, not shown, enclosing the moving magnet linear motor 10. The other end of the linear armature 18 is provided with an output member 30 for connection to a reciprocable mechanical part such as the cutter plate of an electric shaver, or the like.

The coil or winding 14 disposed in the stator 12 of the linear motor 10 may be supplied directly in alternating current at 60 or 50 Hz, or any other frequency. However, applying an alternating current of fixed frequency to the input of the linear motor requires that the inertia of the linear armature 18, the spring constant of the spring 26 and the load to which the output member 30 is connected be properly balanced such that the oscillating linear armature 18 oscillates at, or close to, its resonant frequency. Preferably, the moving magnet oscillating linear motor 10 is operated by a variable frequency alternating current or DC pulse current.

Figure 2:
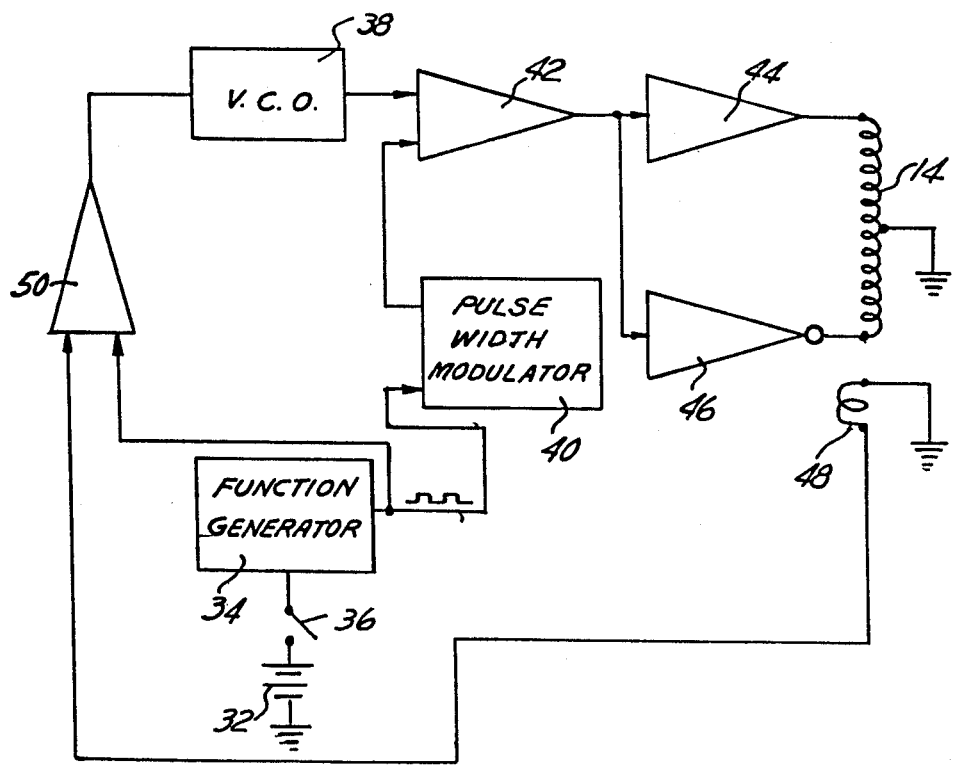
FIG. 2 is a block diagram of a control circuit therefor.

FIG. 2 schematically illustrates, in the form of a block diagram, a power supply for the moving magnet linear motor 10 of the invention. A DC power supply 32 is connected across a function generator 34, preferably through a switch 36. The function generator 34 provides at its output a square wave of adjustable frequency, such that the frequency of the square wave may be adjusted as a function of the mechanical resilience of the linear motor by means, for example, of an adjustable variable resistor, not shown. A voltage controlled oscillator 38 provides at its output a reference signal which is a function of the reference voltage applied to its input. The signal at the output of the function generator 34 is applied to the input of a pulse width modulator 40 that provides at its output a constant voltage AC signal of a pulse width proportional to the input wave form supplied by the function generator 34. The signal at the output of the voltage controlled oscillator 38 and the signal at the output of the pulse width modulator 40 are compared in comparator 42. The output signal from the comparator 42 is applied through a power amplifier 44 to one half of the stator winding 14. The output signal from the comparator 42 is also applied to the other half of the winding 14 through an amplifier inverter 46.

An inductive position sensor 48 generates a feed-back signal of a frequency proportional to the frequency of oscillation of the motor linear armature 18 and of an amplitude proportional to the stroke of the linear armature. The signal at the output of the position sensor 48 is compared in a comparator 50 to the signal at the output of the function generator 34. The signal at the output of the comparator 50 provides the voltage reference control signal for the voltage controlled oscillator 38, thus varying the frequency of the reference signal at the output of the voltage control oscillator 38 which is compared in the comparator 42 with the signal at the output of the pulse width modulator 40. This arrangement provides a feed-back control signal from the detector 48, which varies as a function of the linear armature oscillation amplitude and frequency, for modulating the pulse width constant voltage output signal of the pulse width modulator 40 to adjust the phase and frequency at which the linear armature 18 oscillates, as a function of changing load, such that the power input continuously matches the changing load conditions at the output 30 of the oscillating linear armature 18.

Having thus described the present invention by way of a practical structural example thereof, modifications whereof will be apparent to those skilled in the art, what is claimed as new is as follows:

1. A moving magnet oscillating linear motor comprising a stator having a single planar face, an electrical winding in said stator, a linear armature having a single planar face disposed in close proximity and substantially parallel to said stator planar face, said linear armature being linearly displaceable relative to said stator planar face, a pair of separate permanent magnets affixed side-by-side to said linear armature, said permanent magnets having opposite direction pole polarity in close proximity to and directed toward said winding in said stator, a flux return path member for said permanent magnets, a resilient mechanical restraining member in the form of a coil spring elastically attaching said linear armature to a stationary member, linear bearing means disposed between said stator planar face and said linear armature planar face, means connecting said linear armature to a load, and means for applying an alternately reversing voltage across said winding.

2. The motor of claim 1 wherein said means for applying an alternately reversing voltage across said winding comprises means for generating a first electrical signal of a pre-set adjustable frequency, means for generating a pulsed constant voltage second signal of a pulse width varying as a function of said frequency, means for comparing said second signal with a reference signal for generating a third signal and means for amplifying said third signal and for applying said amplified third signal across said winding.

3. The motor of claim 2 further comprising means for generating a feed-back signal as a function of the amplitude of oscillation of said linear armature, means for comparing said feed-back signal with said first signal, and means for generating from said comparison a control signal for varying said reference signal.

4. The motor of claim 2 further comprising means for generating a feed-back signal as a function of the frequency of oscillation of said linear armature, means for comparing said feed-back signal with said first signal, and means for generating from said comparison a control signal for varying said reference signal.

5. The motor of claim 2 further comprising means for generating a feed-back signal as a function of the amplitude and frequency of oscillation of said linear armature, means for comparing said feed-back signal with said first signal, and means for generating from said comparison a control signal for varying said reference signal.

6. In combination with an oscillating linear motor having a stator member, a linearly reciprocable armature member, an electrical winding disposed in one of said members and a pair of side-by-side permanent magnets of opposite direction pole polarity directed toward said winding and disposed in the other of said members, a power supply for applying an alternately reversing voltage across said winding comprising means for generating a first electrical signal of a pre-set adjustable frequency as a function of mechanical resilience of said linear motor, means for comparing said first signal with a reference signal and for generating a pulsed constant voltage signal of a pulse width varying as a function of said comparison, means for generating a feed-back signal, means for varying said reference signal as a function of variations of a feed-back signal, position sensor means providing said feed-back signal as a function of at least one of said armature member oscillation frequency and amplitude and means for amplifying said pulsed constant voltage signal and for applying said amplified signal across said winding, whereby the phase and frequency at which said linearly reciprocable armature member oscillates vary according to changing load conditions applied on said armature member.

7. The power supply of claim 6 wherein said means for generating said feed-back signal generates said feed-back signal as a function of the amplitude of oscillation of said linear armature member and further comprising means for comparing said feed-back signal with said first signal, and means for generating from said comparison a control signal for varying said reference signal.

8. The power supply of claim 6 wherein said means for generating said feed-back signal generates said feed-back signal as a function of the frequency of oscillation of said linear armature member, and further comprising means for comparing said feed-back signal with said first signal, and means for generating from said comparison a control signal for varying said reference signal.

9. The power supply of claim 6 wherein said means for generating said feed-back signal generates said feed-back signal as a function of the amplitude and frequency of oscillation of said linear armature member, and further comprising means for comparing said feed-back signal with said first signal, and means for generating from said comparison a control signal for varying said reference signal.

* * * * *